US007917632B2

(12) United States Patent
Lee et al.

(10) Patent No.: US 7,917,632 B2
(45) Date of Patent: Mar. 29, 2011

(54) PEER-TO-PEER PROXY SERVER AND COMMUNICATION METHOD THEREOF

(75) Inventors: Sang Bong Lee, Daejeon (KR); Ho Jin Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 605 days.

(21) Appl. No.: 11/949,836

(22) Filed: Dec. 4, 2007

(65) Prior Publication Data

US 2008/0133758 A1    Jun. 5, 2008

(30) Foreign Application Priority Data

Dec. 5, 2006   (KR) .................. 10-2006-0122139

(51) Int. Cl.
*G06F 15/16* (2006.01)
(52) U.S. Cl. ...................... 709/227; 709/204
(58) Field of Classification Search .................. 709/204, 709/205, 227; 707/999.103
See application file for complete search history.

(56) References Cited

U.S. PATENT DOCUMENTS

| 7,111,056 B1 | 9/2006 | Ramey et al. | |
| 2002/0184310 A1* | 12/2002 | Traversat et al. | ............. 709/204 |
| 2008/0162551 A1* | 7/2008 | Geyer et al. | ............... 707/103 R |

FOREIGN PATENT DOCUMENTS

| JP | 2000-112853 A | 4/2000 |
| KR | 1020040031899 | 4/2004 |
| KR | 2006-0075532 A | 7/2006 |
| KR | 1020060097328 | 9/2006 |
| WO | WO03/019394 | 3/2003 |
| WO | WO03/058923 | 7/2003 |

* cited by examiner

*Primary Examiner* — Yves Dalencourt
(74) *Attorney, Agent, or Firm* — Ladas & Parry LLP

(57) ABSTRACT

A peer-to-peer (P2P proxy server and a communication method thereof are provided. In order to participate electronic apparatuses having no built-in P2P middleware in a P2P infrastructure, the P2P proxy server includes: a proxy data communication unit acquiring a reception message transmitted through the P2P infrastructure or transmitting a transmission message to the P24P infrastructure; a legacy apparatus state management unit generating a message for advertising contents stored in the legacy apparatuses and, if the reception message is a message for requesting for sharing specific contents, generating a message for sharing the specific contents; a message management unit parsing the reception message acquired through the proxy data communication unit to transmit the reception message to the legacy apparatus state management unit or inversely parsing the message generated by the legacy apparatus state management unit to generate the transmission message and transmitting the transmission message to the proxy data communication unit; and a legacy apparatus driver connecting to the legacy apparatuses and supporting data communication between the legacy apparatuses and the legacy apparatus state management unit. Accordingly, a legacy apparatus having no built-in P2P middleware can be used as a contents source providing apparatus in the P2P infrastructure.

18 Claims, 4 Drawing Sheets

PEER-TO-PEER PROXY SERVER AND COMMUNICATION METHOD THEREOF

CROSS-REFERENCE TO RELATED APPLICATIONS

This application claims the priority of Korean Patent Application No. 10-2006-0122139 filed on Dec. 5, 2006, in the Korean Intellectual Property Office, the disclosure of which is incorporated herein by reference.

BACKGROUND OF THE INVENTION

1. Field of the Invention

The present invention relates to a proxy server, and more particularly, to a P2P proxy server capable of participating electronic apparatuses having no built-in P2P middleware in a P2P infrastructure and a communication method thereof.

This work Was supported by the IT R&D program of MIC/IITA[2006-S068-01, Development of Virtual Home Platform based on Peer-to-Peer Networking]

2. Description of the Related Art

In a P2P communication technology, communication entities can directly communicate to each other without help of a relay server. In order to implement stable P2P communication, seamless communication is ensured between the communication entities. However, in actual communication environment, disconnection of the seamless communication frequently occurs due to firewall, network address translation, non-IP terminals, dynamics of terminal address, terminal having no built-in P2P middleware, and the like.

Therefore, there has been proposed a ubiquitous computing technology. In the ubiquitous computing technology, a virtual network space for connection between electronic apparatuses in a home network is configured, and contents and services are easily searched and shared any time and anywhere in the virtual network space.

In addition, recently, there has been actively and widely researched an ubiquitous computing technology, in which an overlay-type virtual network is configured on existing transfer layers for seamless communication between the electronic apparatuses, and P2P type cooperative service is provided to the electronic apparatuses based on the overlay-type virtual network.

In addition, due to increasing users' demand for sharing personal contents and development of memory technologies, external storage apparatuses such as a USB memory are combined to the in-door electronic apparatus such a video recorder (VR) and an MP3 player.

The electronic apparatuses provide various connection methods for uploading contents stored in the electronic apparatuses on a personal computer or the Internet. For example, USB, wireless network, or Bluetooth may be used for the connection. All these methods download the contents using applications or driver programs provided by manufacturers of the electronic apparatuses, and edit the downloaded content or register the downloaded contents on Internet.

Due to development of technologies, the in-door electronic apparatus can be used as contents source providing apparatuses. An amount of personal contents is greatly increased, and users' demands for sharing contents are also increased.

Therefore, technologies for enabling in-door electronic apparatuses, particularly, electronic apparatuses using the ubiquitous computing technology to participate in an P2P infrastructure so as to serve as contents source providing apparatuses have been proposed and used.

However, in order to participate the electronic apparatuses in the P2P infrastructure, a P2P middleware for connecting different types of servers and clients in a P2P communication distributed computing environment needs to be additionally built in each of the electronic apparatuses.

Therefore, conventionally, electronic apparatuses having no built-in P2P middleware.

SUMMARY OF THE INVENTION

An aspect of the present invention provides a P2P proxy server relaying messages between electronic apparatuses having no built-in P2P middleware and P2P proxy clients capable of participating electronic apparatuses having no built-in P2P middleware in a P2P infrastructure and a communication method thereof.

According to an aspect of the present invention, there is provided a P2P proxy server participating one or more legacy apparatuses connected thereto in a P2P infrastructure, comprising: a proxy data communication unit acquiring a reception message transmitted through the P2P infrastructure or transmitting a transmission message to the P24P infrastructure; a legacy apparatus state management unit generating a message for advertising contents stored in the legacy apparatuses and, if the reception message is a message for requesting for sharing specific contents, generating a message for sharing the specific contents; a message management unit parsing the reception message acquired through the proxy data communication unit to transmit the reception message to the legacy apparatus state management unit or inversely parsing the message generated by the legacy apparatus state management unit to generate the transmission message and transmitting the transmission message to the proxy data communication unit; and a legacy apparatus driver connecting to the legacy apparatuses and supporting data communication between the legacy apparatuses and the legacy apparatus state management unit.

According to another aspect of the present invention, there is provided a P2P communication system comprising: one or more legacy apparatuses storing contents and profile information; a P2P proxy server advertising the contents stored in the legacy apparatuses or generating a transmission message for sharing specific contents of which sharing is requested and transmitting the transmission message; and one or more P2P proxy clients checking the contents stored in the legacy apparatus through the transmission message, generating a reception message for requesting for sharing the specific contents and transmitting the reception message to the P2P proxy server.

According to still another aspect of the present invention, there is provided a communication method of a P2P (peer-to-peer) proxy server, comprising: if one or more legacy apparatuses are connected, searching for contents stored in the legacy apparatuses to acquire the contents and advertising the acquired contents over one or more P2P proxy clients; acquiring a reception message transmitted from the P2P proxy client and analyzing the reception message; and if the reception message is a message for requesting for sharing specific contents, generating a transmission message for sharing the specific contents and transmitting the transmission message to the P2P proxy client.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
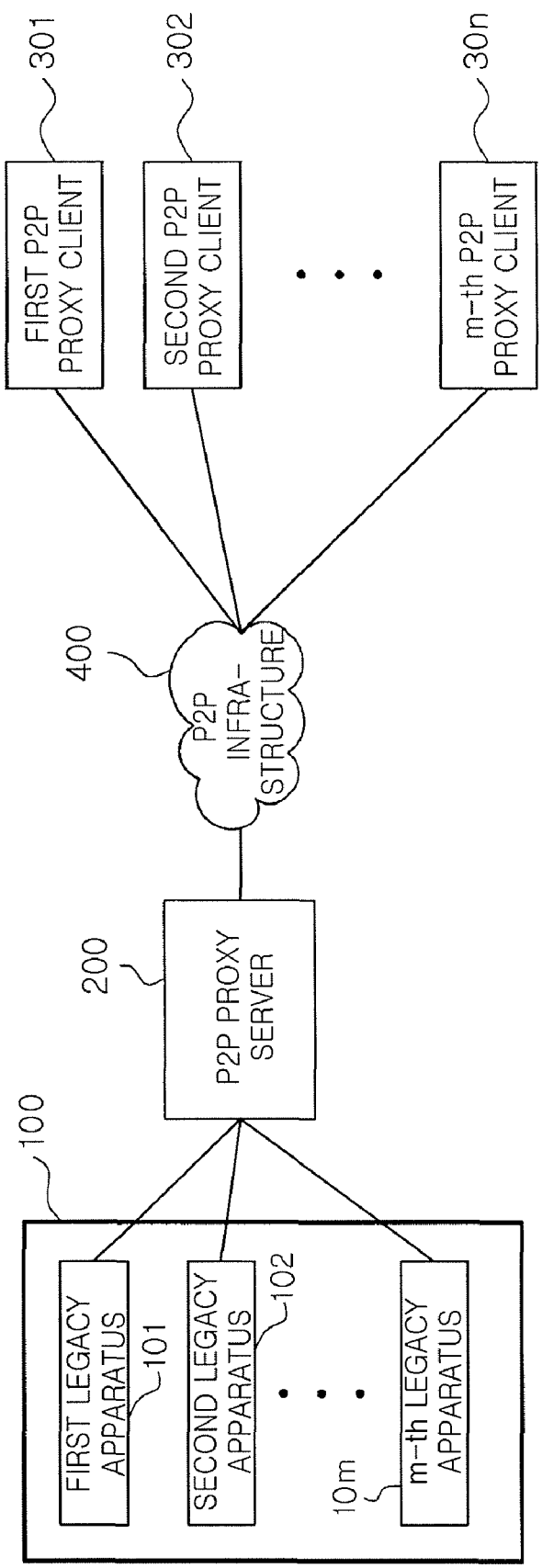
FIG. 1 is a block diagram illustrating a P2P communication system according to an embodiment of the present invention.

Hereinafter, exemplary embodiments of the present invention will now be described in detail with reference to the accompanying drawings. The embodiments of the present invention may be modified in various forms, and the scope of the present invention is not limited to the embodiments. The embodiments of the present invention are provided in order that the ordinarily skilled in the art can have the better understanding of the present invention. In the accompanying drawings, shapes and sizes of elements may be exaggerated for clarifying of the present invention, and like reference numerals denote like elements.

FIG. 1 is a block diagram illustrating a P2P communication system according to an embodiment of the present invention. Referring to FIG. 1, the P2P communication system is configured with a plurality of legacy apparatuses 101 to 10*m* disposed in a home network 100, a P2P proxy server 200 connected to the legacy apparatuses 101 to 10*m*, and a plurality of P2P proxy clients 301 to 30*n* connected to the P2P proxy server 200 through a P2P infrastructure 400.

The legacy apparatuses denote all types of electronic apparatuses which can constitute a conventional in-door ubiquitous computing system.

Each of the legacy apparatuses 101 to 10*m* has contents and profile information. Each of the legacy apparatuses 101 to 10*m* can be connected to the P2P proxy server 200 by using an application or a driver program provided by a manufacturer. Under the control of the P2P proxy server 200, the legacy apparatuses 101 to 10*m* advertise contents and profile information over the P2P proxy clients 301 to 30*n* or perform a remote control task requested by a specific P2P proxy client, for example, the P2P proxy client 301.

The P2P proxy server 200 is connected to the P2P proxy clients 301 to 30*n* through the P2P infrastructure 400. In addition, the P2P proxy server 200 is directly connected to the legacy apparatuses 101 to 10*m* in wireless or wire manner. In addition, the P2P proxy server 200 searches for the contents and profile information stored in the legacy apparatuses 101 to 10*m* and advertise the contents and profile information over all the P2P proxy clients 301 to 30*n*. In response to a message transmitted from a specific P2P proxy client 301, the P2P proxy server 200 performs a searching task or a remote control task for a specific legacy apparatus (for example, the first legacy apparatus 101) and feeds a result of the task back.

The P2P proxy clients 301 to 30*n* access the P2P proxy server 200 through the P2P infrastructure 400 so as to acquire the contents and profile information of the legacy apparatuses 101 to 10*m* from the P2P proxy server 200. If needed, the P2P proxy clients 301 to 30*n* may share the contents and profile information of the specific legacy apparatus 101 or perform remote control of the specific legacy apparatus 101.

Figure 2:
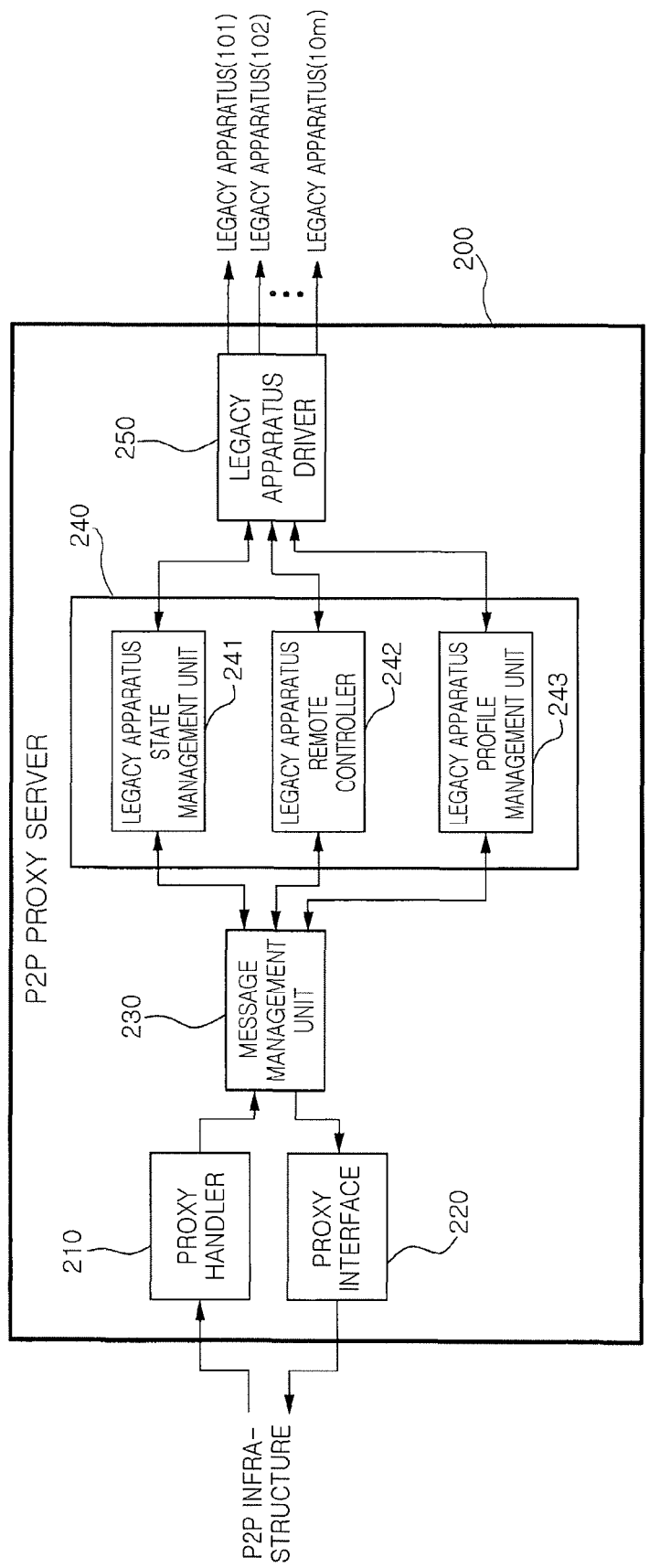
FIG. 2 is a detailed view illustrating a configuration of a P2P proxy server of FIG. 1.

FIG. 2 is a detailed view illustrating a configuration of the P2P proxy server 200 of FIG. 1.

Referring to FIG. 2, the P2P proxy server 200 includes a proxy handler 210, a proxy interface 220, a message management unit 230, a legacy apparatus management unit 240, and a legacy apparatus driver 250. The legacy apparatus management unit 240 includes a legacy apparatus state management unit 241, a legacy apparatus remote controller 242, and a legacy apparatus profile management unit 243.

The proxy handler 210 is directly connected to the P2P middleware (not shown) to acquire a reception message transmitted from the specific P2P proxy client 301 through the P2P infrastructure 400 and transfers the reception message to the message management unit 230.

The reception message is a message for requesting for the P2P searching task or the remote control task. The reception message includes a file sharing request message for requesting for sharing contents, a profile sharing request message for requesting for sharing profile information of a specific legacy apparatus, and a remote control message for requesting for a remote control task for a specific legacy apparatus. The P2P middleware is software of connecting different types of servers and clients in a P2P communication distributed computing environment. In a narrow sense, the P2P middleware denotes software of supplementing differences among various types of hardware, network protocols, applications, LAN environments, PC environments, and operating systems. Namely, the P2P middleware is software for implementing smooth communication between applications and operating systems in different types of environments.

The proxy interface 220 is directly connected to the P2P middleware. The proxy interface 220 transmits a reception message to the P2P infrastructure 400 through the message management unit 230.

The message management unit 230 parses the reception message acquired through the proxy handler 210 and transfers the parsed message to the components 241, 242, and 243 of the legacy apparatus management unit 240. The message management unit 230 inversely parses the message generated by the legacy apparatus management unit 240 to generate the transmission message and transmits the transmission message to the proxy interface 220. For example, if the parsed reception message is a file sharing request message, the message management unit 230 transmits the reception message to the legacy apparatus state management unit 241. If the parsed reception message is a remote control message, the message management unit 230 transmits the reception message to the legacy apparatus remote controller 242. If the parsed reception message is a profile query message, the message management unit 230 transmits the reception message to the legacy apparatus profile management unit 243.

The legacy apparatus state management unit 241 searches for the contents stored in the legacy apparatuses 101 to 10*m* to acquire the contents and generates and re-issues a message for advertising or sharing the contents. Namely, the legacy apparatus state management unit 241 searches for the contents stored in the legacy apparatuses 101 to 10*m* to acquire the contents and generate a message for advertising the acquired contents or a message for advertising storage-state-changed contents (for example, added, removed, or modified contents) In addition, in response to the file sharing request message for requesting for sharing specific contents, the legacy apparatus state management unit 241 generates a message for sharing the contents.

The legacy apparatus remote controller 242 analyzes the remote control message transmitted from the message management unit 230 to determine the legacy apparatus in which the remote control task is performed and performs the remote control task. The legacy apparatus remote controller 242 notifies a result of the remote control task to the message management unit 230.

The legacy apparatus profile management unit 243 searches for the profile information stored in the legacy apparatuses 101 to 10m to acquire the profile information and generates and re-issues a message for advertising or sharing the profile information. Namely, the legacy apparatus profile management unit 243 searches for the profile information stored in the legacy apparatuses 101 to 10m to acquire the profile information and generate a message for advertising the acquired profile information or a message for advertising storage-state-changed profile information (for example, added, removed, or modified profile information). In addition, in response to the file sharing request message for requesting for sharing profile information of a specific legacy apparatus, the legacy apparatus state management unit 241 generates a message for sharing the profile information of the legacy apparatus.

Here, the profile information includes all types of information required for communication and driving of the legacy apparatuses, for example, detailed specifications of the legacy apparatuses, environment information, and access information.

The legacy apparatus driver 250 installs applications and driver programs of the legacy apparatuses 101 to 10m and performs connection to the legacy apparatuses 101 to 10m. As a result, the legacy apparatuses 101 to 10m can recognize the P2P proxy server 200 as a legacy apparatus or a local computer constituting an existing ubiquitous computing system. Accordingly, the legacy apparatuses 101 to 10m can be connected to the P2P proxy server 200 without additional apparatuses.

In this manner, the P2P proxy server 200 relays messages between the legacy apparatuses 101 to 10m and the P2P proxy clients 301 to 30n through the aforementioned components to participate the legacy apparatuses having no built-in P2P middleware in the P2P infrastructure 400.

Figure 3:
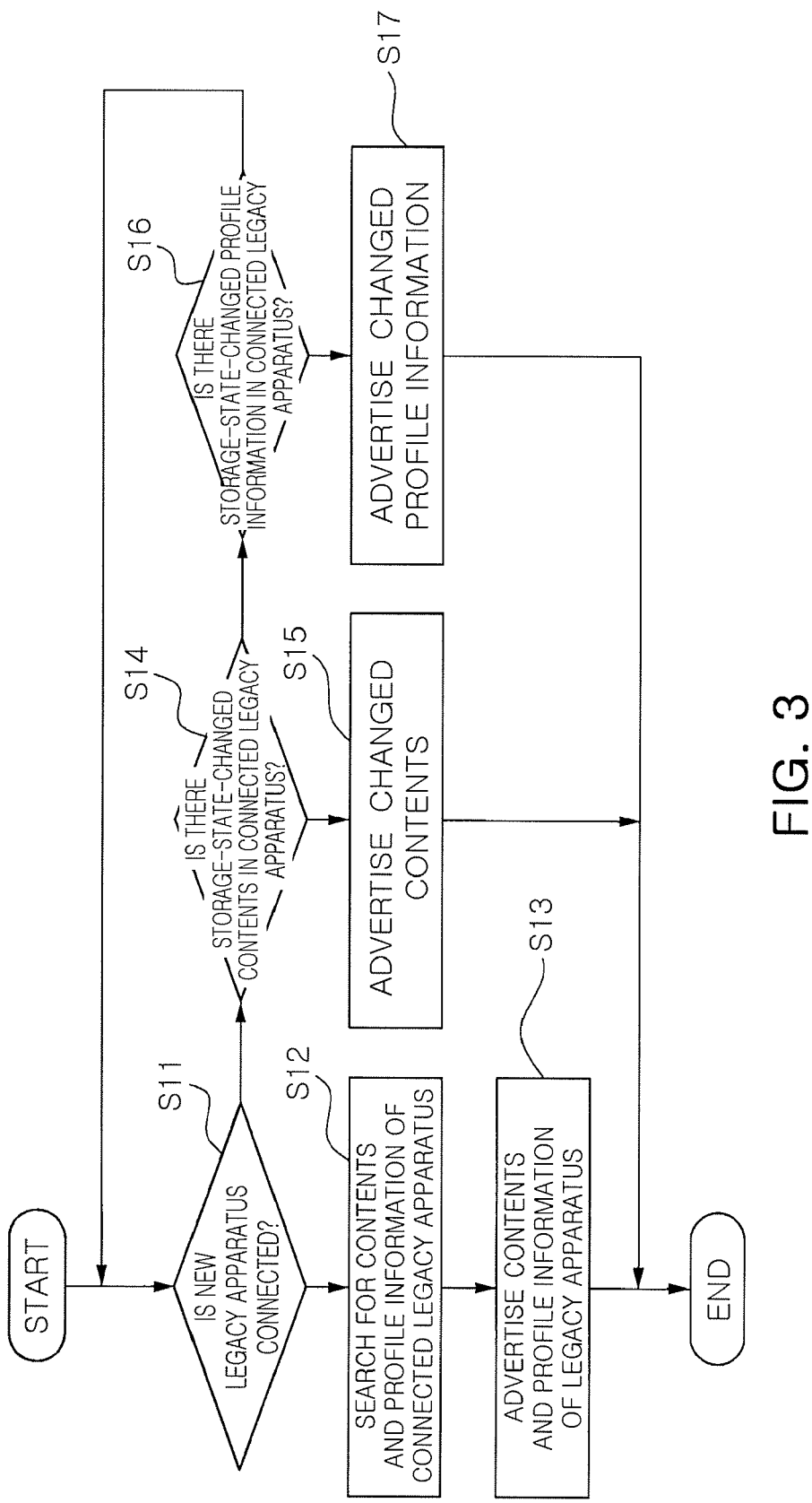
FIG. 3 is a flowchart for explaining a legacy apparatus connection operation and a advertising operation of a P2P proxy server according to the present invention.

FIG. 3 is a flowchart for explaining a legacy apparatus connection operation and an advertising operation of the P2P proxy server 200 according to the present invention.

When one or more legacy apparatuses 101 to 10m are newly connected to the P2P proxy server 200, the P2P proxy server 200 searches for all the contents and profile information stored in the connected legacy apparatuses 101 to 10m to acquire the contents and profile information (S12).

The P2P proxy server 200 generates a transmission message for advertising the acquired contents and profile information over all the P2P proxy clients 301 to 30n connected to the P2P proxy server 200 and outputs the transmission message to the P2P infrastructure 400 (S13). The P2P proxy clients 301 to 30n receives and analyzes the transmission message transmitted from the P2P infrastructure 400 to check the contents and profile information of the legacy apparatuses 101 to 10m connected to the P2P proxy server 200.

If there is storage-state-changed contents in one legacy apparatus 101 among the legacy apparatuses 101 to 10m connected to the P2P proxy server 200 (S14), the P2P proxy server 200 detects the storage-state-changed contents to generate a message for advertising the changed contents and transmits the message to the P2P proxy clients 301 to 30n through the P2P infrastructure 400 (S15).

In addition, if there is storage-state-changed profile information in one legacy apparatus 101 among the legacy apparatuses 101 to 10m connected to the P2P proxy server 200 (S16), the P2P proxy server 200 detects the storage-state-changed profile information to generate a message for advertising the changed profile information and transmits the message to the P2P proxy clients 301 to 30n through the P2P infrastructure 400 (S17).

Therefore, due to the operation of the P2P proxy server 200, the P2P proxy clients 301 to 30n can accurately check the contents and profile information of the legacy apparatuses 101 to 10m connected to the P2P proxy server 200.

Figure 4:
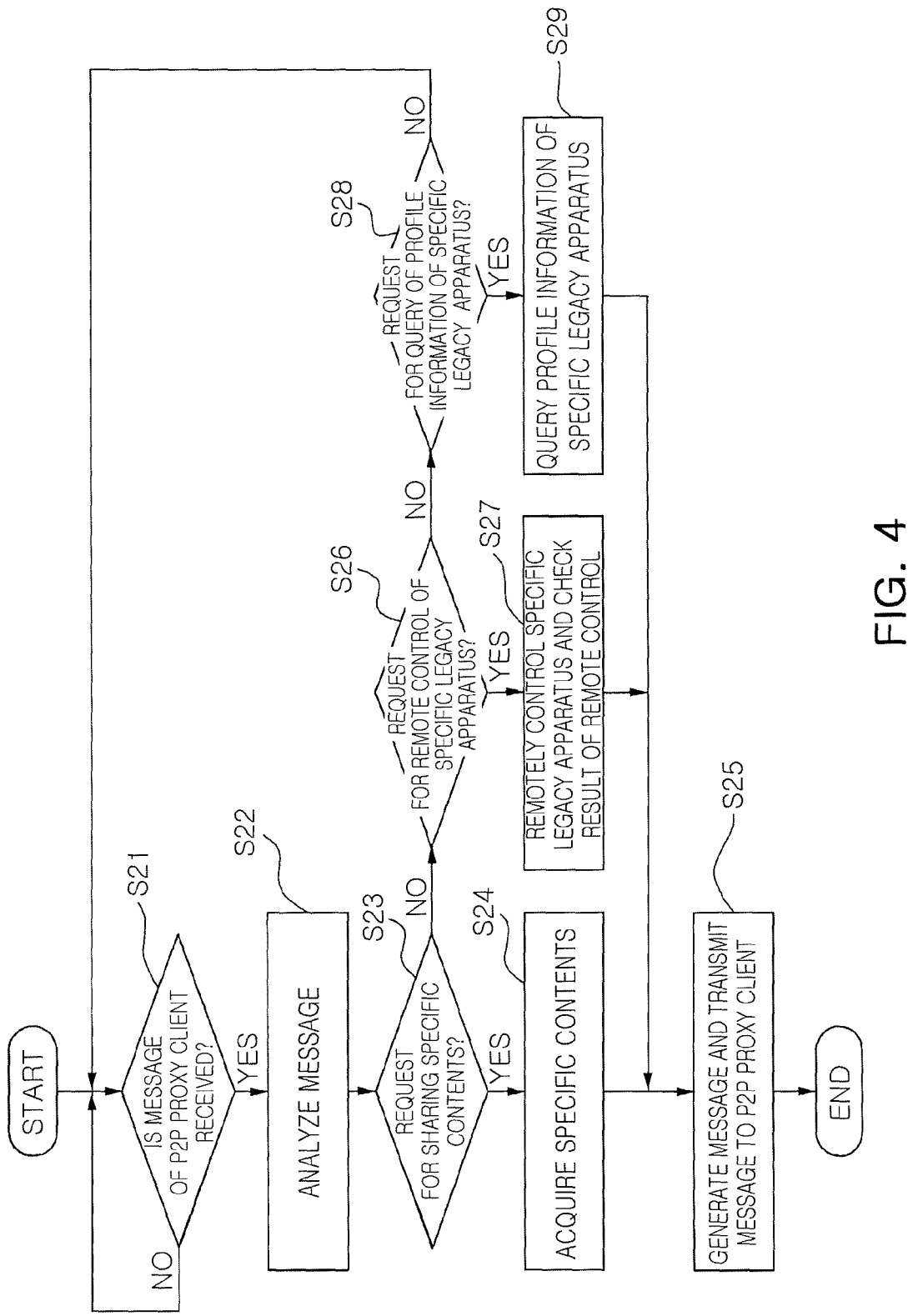
FIG. 4 is a flowchart for explaining a message relay operation of the P2P proxy server according to the present invention.

FIG. 4 is a flowchart for explaining a message relay operation of the P2P proxy server 200 according to the present invention.

When the P2P proxy server 200 receives a reception message from one P2P proxy client 301 among the P2P proxy clients 301 to 30n (S21), the P2P proxy server 200 analyses the reception message (S22).

As a result of the analysis in the step S22, if the reception message is a file sharing request message for requesting for sharing specific contents (S23), the P2P proxy server 200 searches for the contents acquired in the tasks of FIG. 3 to acquire the corresponding contents (S24). The P2P proxy server 200 generates a message including the acquired contents and transmits the message to the P2P proxy client 301 (S25).

As a result of the analysis in the step S22, if the reception message is a remote control message for remotely controlling a specific legacy apparatus 101 (S26), the P2P proxy server 200 performs the requested remote control task in response to the message and checks a result of the remote control task (S27). Next, proceeding to the step S25, the P2P proxy server 200 generates a message for notifying the result of the tasks of the step S26 and transmits the message to the P2P proxy client 301 through the P2P infrastructure 400 (S25).

Finally, as a result of the analysis in the step 22, if the reception message is a profile query message of requesting for profile information of the specific legacy apparatus 101 (S28), the P2P proxy server 200 acquires only the profile information of the legacy apparatus 101 among the profile information of the legacy apparatuses 101 to 10m acquired through the tasks of FIG. 3. Next, proceeding to the step S25, the P2P proxy server 200 generates a message including the acquired profile information and transmits the message to the P2P proxy client 301 through the P2P infrastructure 400 (S25).

In this manner, the P2P proxy server 200 relays the messages between the P2P proxy clients 301 to 30n and the legacy apparatuses 101 to 10m to participate the legacy apparatuses 101 to 10m in the P2P infrastructure 400. As a result, the P2P proxy clients 301 to 30n recognizes the legacy apparatuses 101 to 10m connected to the P2P proxy server 200 as a P2P proxy client in the P2P communication.

According to the present invention, a P2P proxy server relays messages between P2P proxy clients and legacy apparatus to participate a legacy apparatus having no built-in P2P middleware in a P2P infrastructure. Therefore, the legacy apparatus having no built-in P2P middleware can be used as a contents source providing apparatus in the P2P infrastructure.

While the present invention has been shown and described in connection with the exemplary embodiments, it will be apparent to those skilled in the art that modifications and variations can be made without departing from the spirit and scope of the invention as defined by the appended claims.

What is claimed is:

1. A P2P (peer-to-peer) proxy server participating in a P2P infrastructure and connecting to one or more legacy apparatuses, comprising:

a proxy data communication unit acquiring a reception message from one of the P2P proxy clients transmitted through the P2P infrastructure or transmitting a transmission message to the infrastructure;
a legacy apparatus state management unit generating a message for advertising contents stored in the legacy apparatuses and, if the reception message is a message for requesting for sharing specific contents, generating a message for sharing the specific contents;
a message management unit parsing the reception message acquired through the proxy data communication unit to transmit the reception message to the legacy apparatus state management unit or inversely parsing the message generated by the legacy apparatus state management unit to generate the transmission message and transmitting the transmission message to the proxy data communication unit; and
a legacy apparatus driver connecting to the legacy apparatuses and installing applications and driver programs in the legacy apparatuses to enable the legacy apparatuses to relay messages to and from the P2P proxy clients to enable supporting data communication between the legacy apparatuses and the legacy apparatus state management unit, wherein the legacy apparatuses have no built-in P2P middleware.

2. The P2P proxy server of claim 1, further comprising a legacy apparatus profile management unit generating a message for advertising profile information of the legacy apparatuses and, if the reception message is a message for requesting for sharing the profile information of a specific legacy apparatus, generating a message for sharing the profile information of the specific legacy apparatus.

3. The P2P proxy server of claim 1, further comprising a legacy apparatus remote controller, if the reception message is a message for remotely controlling the specific legacy apparatus, performing remote control of the specific legacy apparatus, and generating a message for notifying a result of the control.

4. The P2P proxy server of claim 1, wherein the proxy data communication unit comprises:
a proxy handler acquiring the reception message transmitted through the P2P infrastructure and transferring the reception message to the message management unit; and
a proxy interface transmitting the transmission message transferred from the message management unit 230 to the P2P infrastructure.

5. The P2P proxy server of claim 1, wherein the legacy apparatus state management unit further includes a function of, if there is storage-state-changed contents in the legacy apparatus, generating a message for advertising the changed contents.

6. The P2P proxy server of claim 1, wherein the legacy apparatuses are electronic apparatuses constituting a ubiquitous computing system.

7. A P2P (peer-to-peer) communication system comprising:
one or more legacy apparatuses storing contents and profile information;
a P2P proxy server installing applications and driver programs in the legacy apparatuses to enable the legacy apparatuses to relay messages to and from P2P proxy clients and for allowing the P2P proxy server to advertise the contents stored in the legacy apparatuses or generating a transmission message for sharing specific contents of which sharing is requested and transmitting the transmission message; and
one or more P2P proxy clients checking the contents stored in the legacy apparatus through the transmission message, generating a reception message for requesting for sharing the specific contents and transmitting the reception message to the P2P proxy server, wherein the legacy apparatuses have no built-in P2P middleware.

8. The P2P communication system of claim 7, wherein the P2P proxy server comprises:
a proxy data communication unit acquiring the reception message transmitted from the P2P proxy clients or transmitting the transmission message to the P24P infrastructure;
a legacy apparatus state management unit generating a message for advertising contents stored in the legacy apparatuses and, if the reception message is a message for requesting for sharing specific contents, generating a message for sharing the specific contents;
a message management unit parsing the reception message acquired through the proxy data communication unit to transmit the reception message to the legacy apparatus state management unit or inversely parsing the message generated by the legacy apparatus state management unit to generate the transmission message and transmitting the transmission message to the proxy data communication unit; and
a legacy apparatus driver connecting to the legacy apparatuses and supporting data communication between the legacy apparatuses and the legacy apparatus state management unit.

9. The P2P communication system of claim 7, wherein the P2P proxy server further comprises a function of requesting for sharing profile information of a specific legacy apparatus or generating the reception message for requesting for remote control of the specific legacy apparatus.

10. The P2P communication system of claim 8 or 9, wherein the P2P proxy server further comprises a legacy apparatus profile management unit generating a message for advertising profile information of the legacy apparatuses and, if the reception message is a message for requesting for sharing the profile information of a specific legacy apparatus, generating a message for sharing the profile information of the specific legacy apparatus.

11. The P2P communication system of claim 8 or 9, wherein the P2P proxy server further comprises a legacy apparatus remote controller, if the reception message is a message for remotely controlling the specific legacy apparatus, performing remote control of the specific legacy apparatus, and generating a message for notifying a result of the control.

12. The P2P communication system of claim 7, wherein the proxy data communication unit comprises:
a proxy handler acquiring the reception message transmitted from the P2P proxy clients; and
a proxy interface transmitting the reception message transferred from the message management unit 230 to the P2P infrastructure.

13. The P2P communication system of claim 7, wherein the legacy apparatus state management unit further includes a function of, if there is storage-state-changed contents in the legacy apparatus, generating a message for advertising the changed contents.

14. The P2P communication system of claim 7, wherein the legacy apparatuses are electronic apparatuses constituting a ubiquitous computing system.

15. A communication method of a P2P (peer-to-peer) proxy server, comprising:
installing applications and driver programs in one or more legacy apparatuses to enable the legacy apparatuses to relay messages to and from P2P proxy clients;

if one or more legacy apparatuses are connected, searching for contents stored in the legacy apparatuses to acquire the contents and advertising the acquired contents over one or more P2P proxy clients;

acquiring a reception message transmitted from the P2P proxy client and analyzing the reception message; and if the reception message is a message for requesting for sharing specific contents, generating a transmission message for sharing the specific contents and transmitting the transmission message to the P2P proxy client, wherein the legacy apparatuses have no built-in P2P middleware.

16. The communication method of claim 15, further comprising:

searching for profile information of the legacy apparatuses to acquire the profile information and advertising the profile information over the one or more P2P proxy clients; and if the reception message is a message for requesting for sharing profile information of the specific legacy apparatus, generating the transmission message for sharing the profile information of the specific legacy apparatus and transmitting the transmission message to the P2P proxy client.

17. The communication method of claim 15, further comprising, if the reception message is a message for requesting for remotely controlling the specific legacy apparatus, performing remote control of the specific legacy apparatus and generating a message for notifying a result of the control.

18. The communication method of claim 15, wherein the advertising of the contents comprises:

searching for the contents of the legacy apparatuses to acquire the contents;

advertising the acquired contents over the P2P proxy clients; and if there is storage-state-changed contents in the legacy apparatuses, advertising the storage-state-changed contents over the P2P proxy clients.

* * * * *